(12) United States Patent
Eckart

(10) Patent No.: US 11,654,769 B2
(45) Date of Patent: May 23, 2023

(54) DRIVELINE UNIT HOUSING

(71) Applicant: GKN Automotive Limited, Birmingham (GB)

(72) Inventor: John Eckart, Lake Orion, MI (US)

(73) Assignee: GKN Automotive Limited, Birmingham (GB)

( * ) Notice: Subject to any disclaimer, the term of this patent is extended or adjusted under 35 U.S.C. 154(b) by 289 days.

(21) Appl. No.: 17/037,882

(22) Filed: Sep. 30, 2020

(65) Prior Publication Data

US 2022/0097517 A1 Mar. 31, 2022

(51) Int. Cl.
*B60K 17/08* (2006.01)

(52) U.S. Cl.
CPC ........... *B60K 17/08* (2013.01); *B60Y 2410/10* (2013.01)

(58) Field of Classification Search
CPC ................ B60Y 2410/10; B60K 17/08; B60K 2001/001
See application file for complete search history.

(56) References Cited

U.S. PATENT DOCUMENTS

| | | | | |
|---|---|---|---|---|
| RE14,398 E | * | 11/1917 | Lindsay | ........................ 475/229 |
| 2,480,836 A | * | 9/1949 | Buckendale | ........... B60K 17/16 |
| | | | | 74/370 |
| 2,561,335 A | * | 7/1951 | Buckendale | ............ F16H 48/08 |
| | | | | 475/230 |
| 4,004,472 A | * | 1/1977 | Millward | ................ F16H 48/08 |
| | | | | 475/247 |
| 4,244,242 A | * | 1/1981 | Uno | ....................... F16H 57/031 |
| | | | | 475/160 |
| 4,860,612 A | * | 8/1989 | Dick | ...................... B60K 17/34 |
| | | | | 475/221 |
| 5,657,672 A | * | 8/1997 | Mochizuki | ............ F16H 57/037 |
| | | | | 74/606 R |
| 6,158,303 A | * | 12/2000 | Shiraishi | .............. B60K 17/344 |
| | | | | 475/221 |
| 6,729,206 B2 | * | 5/2004 | Hayabuchi | .......... F16H 61/0009 |
| | | | | 74/606 R |
| 7,178,424 B2 | * | 2/2007 | Petruska | ............... F16C 35/067 |
| | | | | 74/606 R |
| 7,325,643 B2 | * | 2/2008 | Shimizu | .................. B60T 1/065 |
| | | | | 180/385 |
| 7,331,423 B2 | * | 2/2008 | Inoue | .................. F16H 57/0423 |
| | | | | 184/6.12 |

(Continued)

*Primary Examiner* — Paul N Dickson
*Assistant Examiner* — Timothy Wilhelm
(74) *Attorney, Agent, or Firm* — Reising Ethington P.C.

(57) ABSTRACT

A driveline unit housing includes a body defining an interior, a central portion, and a plurality of openings each adapted to receive a shaft. A mounting body has a mounting surface defining one of the openings, the mounting surface includes a plurality of mounting holes and has a peripheral length greater than that of the central portion. Support walls extend between the central portion and mounting body, and extend axially relative to an axis of rotation of a shaft received through the opening defined by the mounting surface, and at least a majority of the support walls extend radially and a plane through and parallel to each such support wall intersects an axis of the mounting holes and the axis of rotation. Spaces defined between the support walls span a majority of a circumference of an imaginary circle that intersects each support wall.

20 Claims, 8 Drawing Sheets

(56) References Cited

U.S. PATENT DOCUMENTS

| | | | | |
|---|---|---|---|---|
| 7,585,032 B2* | 9/2009 | Seeds | | B62D 7/18 |
| | | | | 301/124.1 |
| 8,434,386 B2* | 5/2013 | Gooden | | F16H 57/0412 |
| | | | | 74/606 A |
| 8,549,959 B2* | 10/2013 | Kasuya | | B60K 6/48 |
| | | | | 74/661 |
| 8,667,864 B2* | 3/2014 | Kenmotsu | | F16H 57/038 |
| | | | | 475/198 |
| 9,045,163 B2* | 6/2015 | Theodore | | B60K 6/50 |
| 9,120,374 B2* | 9/2015 | Peura | | B60K 17/344 |
| 9,169,916 B2* | 10/2015 | Niimura | | F16H 57/038 |
| 9,303,696 B2* | 4/2016 | Phelps | | F16D 25/123 |
| 9,632,012 B2* | 4/2017 | Meinhardt | | F16H 57/037 |
| 9,834,038 B2* | 12/2017 | Chung | | B60B 27/0021 |
| 9,909,660 B2* | 3/2018 | Toaso, Jr. | | F16H 57/0423 |
| 10,583,734 B2* | 3/2020 | Morton | | B60K 23/0808 |
| 10,626,979 B2* | 4/2020 | Hayes | | F16N 7/38 |
| 10,864,818 B2* | 12/2020 | Eschenburg | | B60K 17/36 |
| 10,876,628 B2* | 12/2020 | Gruber | | B60K 1/00 |
| 10,962,102 B2* | 3/2021 | Barillot | | F16H 57/0427 |
| 11,002,352 B2* | 5/2021 | Ghatti | | F16H 48/08 |
| 11,052,758 B2* | 7/2021 | Eschenburg | | F16H 57/0457 |
| 11,149,839 B2* | 10/2021 | Jansson | | F16H 57/0483 |
| 11,225,107 B1* | 1/2022 | Peck | | B60B 35/14 |
| 11,239,724 B2* | 2/2022 | Nakamatsu | | H02K 7/006 |
| 11,293,534 B2* | 4/2022 | Downs | | B60K 1/00 |
| 11,318,828 B2* | 5/2022 | Chopra | | F16H 3/091 |
| 11,326,687 B1* | 5/2022 | Ghatti | | B60K 17/12 |
| 11,338,660 B2* | 5/2022 | Laforce | | B60K 1/00 |
| 11,431,220 B2* | 8/2022 | Nakamatsu | | H02K 5/225 |
| 2006/0219037 A1* | 10/2006 | Inose | | B60K 17/344 |
| | | | | 74/424 |
| 2008/0006471 A1* | 1/2008 | Nakamura | | B62D 5/0424 |
| | | | | 180/444 |
| 2015/0267803 A1* | 9/2015 | Marathe | | F16H 57/0457 |
| | | | | 184/6.12 |
| 2016/0047461 A1* | 2/2016 | Kelly | | F16H 57/032 |
| | | | | 74/607 |
| 2016/0084365 A1* | 3/2016 | Besemer | | F16H 48/32 |
| | | | | 475/86 |
| 2016/0369879 A1* | 12/2016 | Martin | | B60K 17/165 |
| 2018/0319276 A1* | 11/2018 | Morton | | B60K 23/0808 |
| 2020/0127528 A1* | 4/2020 | Nakamatsu | | H02K 7/006 |
| 2020/0313506 A1* | 10/2020 | Murakami | | H02K 5/24 |

* cited by examiner

FIG. 2

DRIVELINE UNIT HOUSING

TECHNICAL FIELD

The present disclosure relates generally to a housing for a vehicle driveline unit.

BACKGROUND

In general, vehicle drivelines transmit torque from a vehicle's engine to its wheels. Automotive drivelines, such as all-wheel drive (AWD) drivelines, commonly employ final drive units (FDUs) for transmitting torque to left and right sideshafts that are located downstream an engine and downstream of a transmission—oftentimes, FDUs receive driven torque from a propshaft. Final drive units can be mounted at the rear of an automotive driveline or at the front, depending on the architecture of the particular driveline and the location of its engine and transmission. And FDUs can include differential gearsets that allow wheels on one sideshaft to spin faster or slower than wheels on the other sideshaft, and that apportion driven torque between the sideshafts. The FDUs may have cast metal housings that are relatively large and heavy to handle so that they can withstand the loads applied thereto, and to suitably mount and support a torque tube for the propshaft.

SUMMARY

In at least some implementations, a housing for a driveline unit includes a body defining an interior and having a central portion with an inner surface defining part of the interior and an outer surface defining part of an exterior of the housing, and a plurality of openings through the housing each adapted to receive a driveline shaft with rotation of each driveline shaft relative to the body. The body includes a mounting body having a mounting surface adjacent to and defining one of the openings, the mounting surface includes a plurality of mounting holes, the mounting surface has a peripheral length greater than a peripheral length of the central portion. The body includes a plurality of support walls extending between the central portion and the mounting body, the support walls extend axially relative to an axis of rotation of a shaft received through the opening defined by the mounting surface, and at least a majority of the support walls extend radially and a plane through and parallel to each of the at least a majority of the support walls intersects an axis of the mounting holes and the axis of rotation. And the support walls are circumferentially spaced apart and spaces defined between the support walls span a majority of a circumference of an imaginary circle that intersects each of said at least a majority of the support walls.

In at least some implementations, at least a majority of the support walls are circumferentially aligned with a mounting hole and include a circumferentially wider portion in which a mounting hole is at least partially defined, the wider portion is axially adjacent to the mounting body and said at least a majority of the support walls have a circumferentially thinner portion extending axially from the wider portion. The wider portions may be wider than the diameter of the mounting holes and axially longer than the axial depth of the mounting holes. In at least some implementations, in said at least a majority of the support walls that have a wider portion, a thickness in the circumferential direction of said at least a majority of the support walls at a location axially spaced from the respective wider portion is between 10% and 40% of the thickness in the circumferential direction of the wider portion. In at least some implementations, one support wall that is not part of said at least a majority of support walls that includes a wider portion extends axially from the mounting body and is circumferentially located between two support walls of said at least a majority of support walls that includes a wider portion.

In at least some implementations, the support walls are spaced apart circumferentially by at least forty degrees. In at least some implementations, the distance from the axis of rotation of a shaft received through the opening defined by the mounting surface to an outer surface of the central portion is between 30% and 75% of the distance between the axis of rotation of a shaft received through the opening defined by the mounting surface and the outer edge of a support wall.

In at least some implementations, the housing includes a connecting wall that extends between two support walls and which connects together and is circumferentially between two mounting holes. The connecting wall may be connected to a support wall that extends radially relative to the axis of rotation.

In at least some implementations, a driveline unit for a vehicle includes a propshaft driven for rotation about an axis, a torque tube surrounding at least part of the propshaft, two sideshafts each adapted to be coupled to a respective vehicle wheel, differential gears coupled to the sideshafts, a drive gear coupled to the propshaft for rotation with the propshaft, a driven gear driven for rotation by the drive gear and coupled to a gear of the differential gears, and a housing. The housing has a body with a first opening through which one sideshaft extends, a second opening through which the other sideshaft extends, a third opening through which the propshaft extends, a mounting surface to which the torque tube is mounted by a plurality of bolts extending into a plurality of mounting holes formed in the mounting surface, wherein the differential gears and drive gear are received within an interior of the housing, wherein the body that includes a plurality of support walls extending between the central portion and the mounting body, the support walls extend axially relative to an axis of rotation of the propshaft, and at least a majority of the support walls extend radially and a plane through the at least a majority of the support walls intersects an axis of the mounting holes and the axis of rotation.

In at least some implementations, the support walls are circumferentially spaced apart and spaces defined between the support walls span a majority of a circumference of an imaginary circle that intersects each of said at least a majority of the support walls. In at least some implementations, the body has a central portion with an inner surface defining part of the interior and an outer surface defining part of an exterior of the housing, and wherein the body includes a mounting body that includes the mounting surface, and the mounting surface has a peripheral length greater than a peripheral length of the outer surface of the central portion.

In at least some implementations, at least a majority of the support walls are circumferentially aligned with a mounting hole and include a circumferentially wider portion in which a mounting hole is at least partially defined, the wider portion is axially adjacent to the mounting body and said at least a majority of the support walls have a circumferentially thinner portion extending axially from the wider portion. In said at least a majority of the support walls that have a wider portion, a thickness in the circumferential direction of said at least a majority of the support walls at a location axially spaced from the respective wider portion may be between 10% and 40% the thickness in the circumferential direction of the wider portion.

Various features and components may be combined together except where they are mutually exclusive, in accordance with the description below, which is intended to illustrate the various features rather than limit the inventions described herein.

BRIEF DESCRIPTION OF THE DRAWINGS

The following detailed description of preferred implementations and best mode will be set forth with regard to the accompanying drawings, in which:

FIG. 2 is a sectional view of a driveline unit for transferring torque from a propshaft to sideshafts;

DETAILED DESCRIPTION

Figure 1:
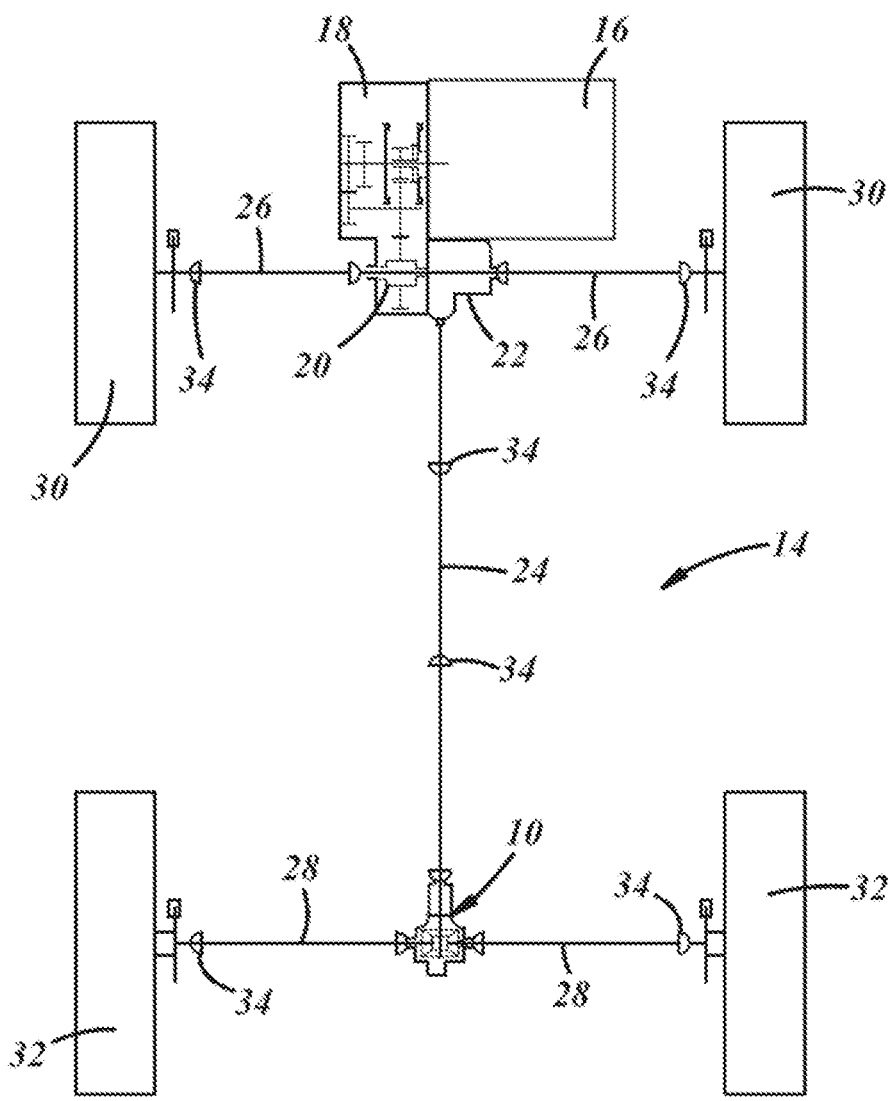
FIG. 1 is a schematic of an example vehicle driveline.

Referring in more detail to the drawings, FIG. 1 illustrates an example architecture of an all-wheel drive (AWD) vehicle driveline 14 for an automobile. The driveline 14 receives torque input from an engine 16 and a transmission 18, and includes a front differential 20, a power transfer unit (PTU) 22, a propshaft 24, a final drive unit (FDU) 10, front sideshafts 26, and rear sideshafts 28. The front and rear sideshafts 26, 28 respectively spin front and rear wheels 30, 32. In the example here, various joints 34 are located at the propshaft 24 and at the sideshafts 26, 28. The joints 34 could be constant velocity joints, universal joints, tripod joints, cardan joints, or another kind of joint. The various shafts may collectively be referred to as driveline shafts.

The PTU 22, also known as a power take-off unit, is a multi-piece mechanism with gears, shafts, and other components that work together to transmit torque to the propshaft 24. The FDU 10 also may include gears, shafts, and other components that work together to transmit torque from the propshaft 24 to the rear sideshafts 28. Together, the driveline components transmit torque from the engine 16 and to the wheels 30, 32. Still, the driveline 14 could have other architectures in other examples and might include more, less, and/or different components than those depicted in FIG. 1 and described here, and the components can be arranged in different ways.

While described below with specific referent to an embodiment of a final drive unit 10, the automotive driveline unit can be, for example, a power transfer unit (PTU), a final drive unit (FDU) or a rear drive unit (RDU). In this regard, the phrase "automotive driveline unit" is used in a broad sense to embrace PTUs, FDUs, and RDUs and related devices. Furthermore, as an aside, relational terms such as "above" or "below" refer to the normal orientation of the unit and with respect to the direction of the force of gravity.

Figure 2:
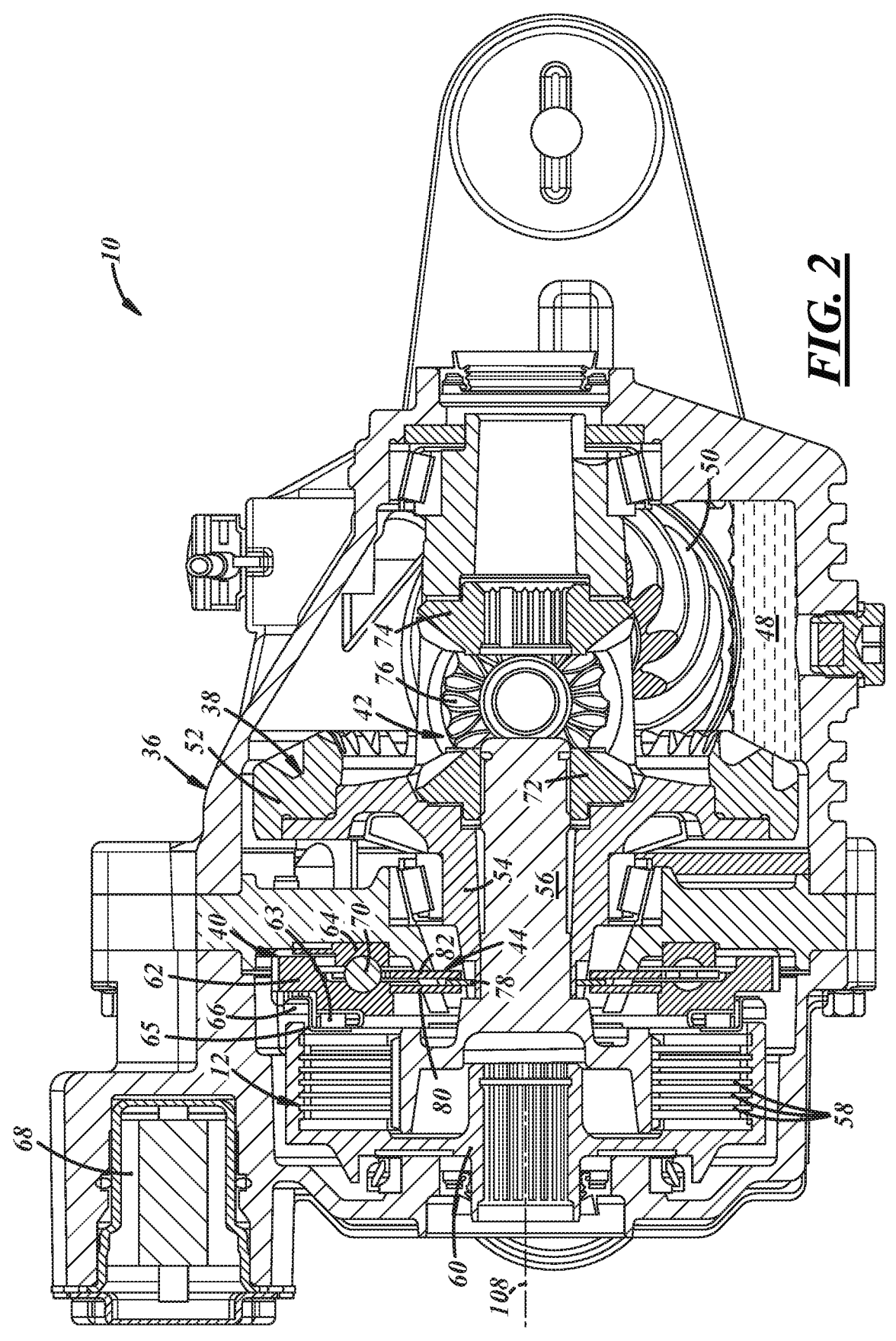

Referring to FIG. 2, the FDU 10 is a multi-piece mechanism with components that work together to transmit torque from the propshaft 24 and to the rear sideshafts 28. The FDU 10 can have different designs, constructions, and components depending on, among other possible influences, the architecture of the driveline 14, the design and construction of the propshaft 24 and that of the rear sideshafts 28, packaging requirements, and torque output demands. In the embodiment presented in FIG. 2, the FDU 10 includes a housing 36, a final drive gearset 38, a clutch 12, an actuator 40 for the clutch, a differential gearset 42 and a brake 44.

The housing 36 serves as a casing and support for other components of the FDU 10. Lubricant such as oil is held in the housing 36 to facilitate lubricating the gears, clutch plates, bearings, and other items enclosed in the FDU 10 as those items rotate, mesh, move, and engage during use. The housing 36 is filled only partway with lubricant to make a resulting lubricant bath 48—in FIG. 2, the lubricant bath is shown at rest and mostly undisturbed from the FDU's internal components. The level of the lubricant bath 48 can be raised or lowered from that depicted in FIG. 2. Lubricant from the lubricant bath 48 may be distributed among the final drive gearset 38, clutch 12, differential gearset 42, and brake 44 via the rotating components of the final drive gearset 38.

The final drive gearset 38 receives torque transmission and driven rotational input from the propshaft 24. The final drive gearset 38 can take different forms in different embodiments. In FIG. 2 the final drive gearset 38 has a hypoid design and construction and includes a drive gear, shown as pinion gear 50, that is meshed with a ring gear 52. The ring gear 52 is partly submerged in the lubricant bath 48 and throws lubricant about as the ring gear rapidly rotates. The ring gear 52 can be connected to a differential housing 54 which serves as a differential case of the differential gearset 42; in an example of the FDU 10 in which the differential gearset 42 is lacking, the differential housing 54 may simply be a housing with a connection to the ring gear 52. The differential housing 54 can be attached to an inner plate carrier or inner disc carrier 56 so that the two rotate together in unison. The attachment can be effectuated via a spline interfit or another attachment technique. During use of the FDU 10, torque is transmitted from the pinion gear 50, to the ring gear 52, and to the inner plate carrier 56.

The clutch 12 enables selective connection and torque transmission between the final drive gearset 38 and one of the rear sideshafts 28. The clutch 12 can take different forms in different embodiments. In the embodiment shown in FIG. 2, the clutch 12 has a clutch pack containing multiple clutch plates 58. Some clutch plates 58 are attached to an extension of the inner plate carrier 56, and some clutch plates are attached to an outer plate carrier 60. The outer plate carrier 60 is internally splined, as shown, and coupled with the rear sideshaft 28 on that side of the FDU 10—this coupling can be accomplished in other ways, as desired. An axis 108 depicted in FIG. 2 represents an approximate center axis about which the rear sideshaft 28 rotates during operation.

When the clutch 12 is actuated by the actuator 40, the clutch plates 58 are compressed together, the inner plate carrier 56 is coupled to the outer plate carrier 60 and rotation/torque is transmitted from the final drive gearset 38 and to the rear sideshaft 28. When the clutch 12 is not actuated by the actuator 40, the clutch plates 58 are separated apart from one another to disconnect the inner plate carrier 56 and the outer plate carrier 60. The disconnection ceases the transmission of rotation from the final drive gearset 38 to the rear sideshaft 28.

The actuator 40 controls actuation of the clutch 12 to selectively connect and disconnect the final drive gearset 38 and the respective rear sideshaft 28. The actuator's functionality can be managed by an electronic control unit (ECU) or another type of controller. The actuator 40 can take different forms in different embodiments.

In the embodiment shown in FIG. 2, the actuator 40 includes a plate 62, a reaction collar 64, a spring 66, and an electric motor 68. The plate 62 and reaction collar 64 together define one or more inclined (e.g. relative to the axis S) ball ramp tracks for interacting with one or more balls 70. The plate 62 is driven to rotate by the electric motor 68, and in turn moves axially with respect to the inner plate carrier 56 as the balls 70 ride in the ball ramp tracks. Rotation of the plate 62 in one direction (clockwise or counterclockwise) moves the plate in a first linear and axial direction, and rotation of the plate in the opposite direction moves the plate in a second opposite linear and axial direction. These axial displacements bring the plate 62 between an actuated position toward the clutch plates 58 to compress them, and a deactuated position away from the clutch plates to separate them. In FIG. 2, the plate 62 is depicted in the deactuated position with the clutch plates 58 separated. During the movements, the reaction collar 64 remains static and merely provides a reaction structure for the plate's movement. Indeed, the reaction collar 64 can have a fixed attachment to the housing 36. The spring 66 exerts a biasing force against the plate 62 to urge the plate to the deactuated position. Further, in the embodiment of FIG. 2, the actuator 40 includes a bearing 63 such as an axial needle bearing, and includes a spring seat and bearing thrust washer 65. Still, in other forms the actuator 40 can have more, less, and/or different components than those shown in the figures and described here.

The differential gearset 42 performs differential functionalities between the rear sideshafts 28 of the driveline 14. The differential gearset 42 can take different forms in different embodiments. In the embodiment shown in FIG. 2, the differential gearset 42 includes side gears 72, 74 and pinion gears 76 (only one shown) arranged on a pin (not shown). The side gear 72 is attached to the inner plate carrier 56 for rotation therewith, and the side gear 74 transmits torque to the rear sideshaft 28 on that side of the FDU 10. Still, in other forms the differential gearset 42 can have more, less, and/or different components than those shown in the figures and described here. And yet still, as previously set forth, the differential gearset 42 need not be provided in all embodiments of the FDU 10.

Figure 3:
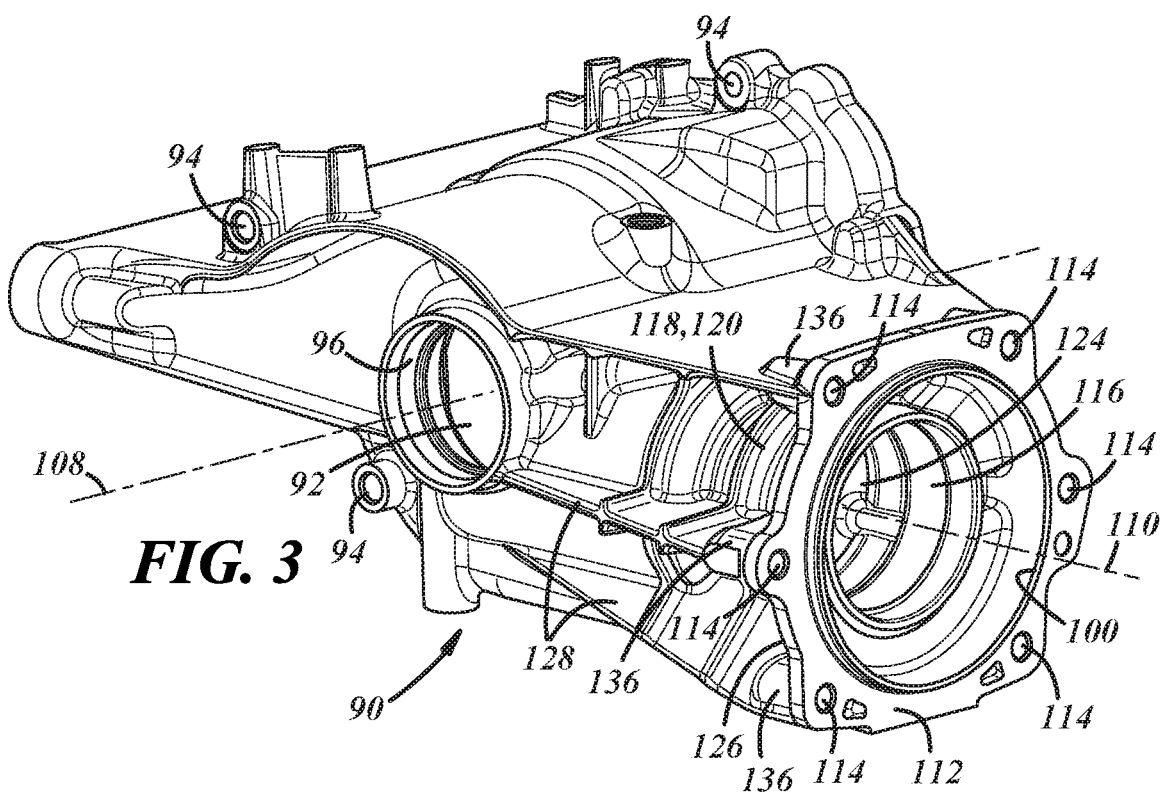
FIG. 3 is a front and left side perspective view of a housing for the driveline unit.
Figure 4:
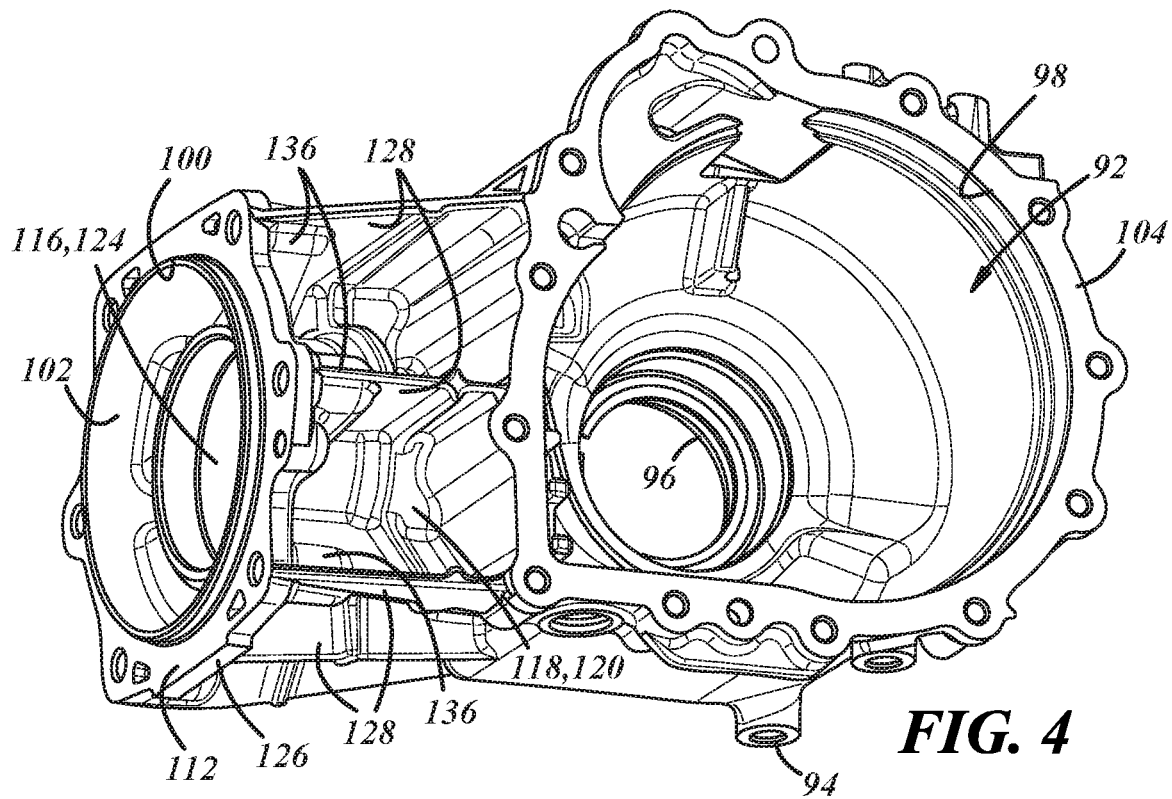
FIG. 4 is a right side and front perspective view of the housing.
Figure 5:
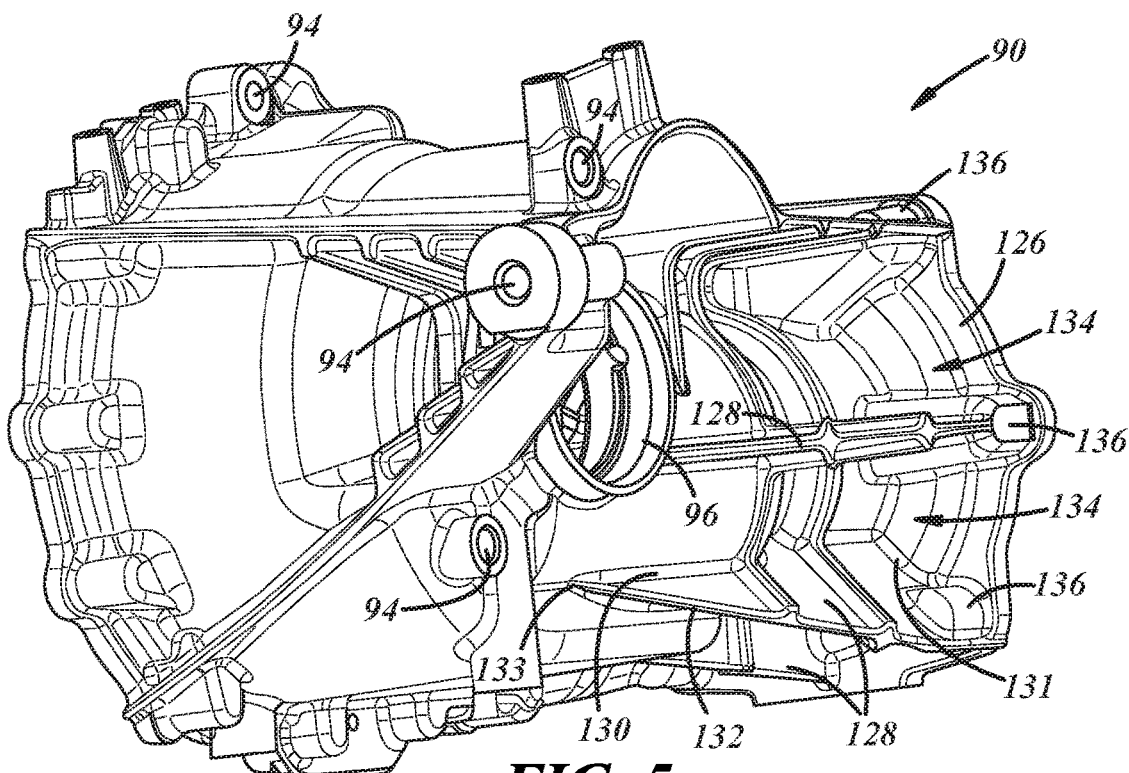
FIG. 5 is a rear and right side perspective view of the housing.
Figure 6:
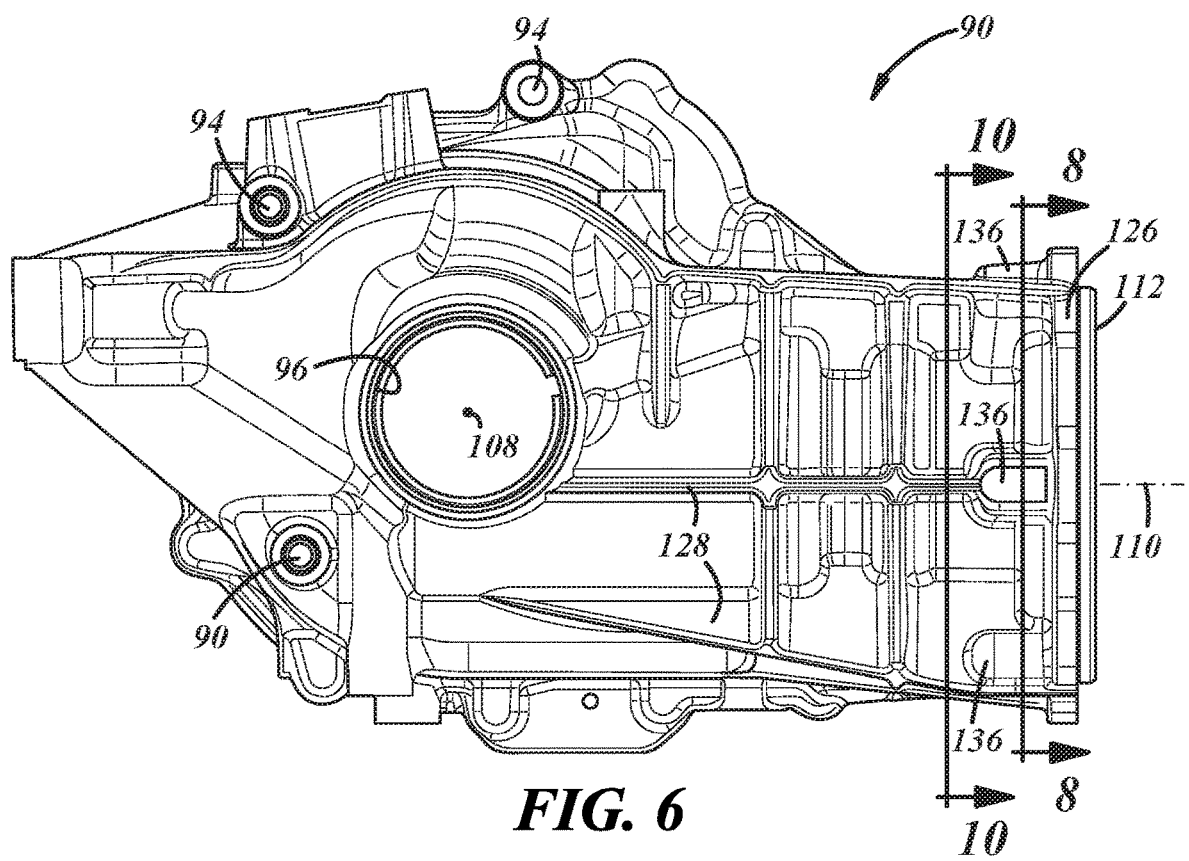
FIG. 6 is a left side view of the housing.

The brake 44 retards and may preclude unwanted rotations that might occur from the deactivated clutch 12 and to the final drive gearset 38 as a consequence of adhesion between the clutch plates 58 and backdriving. The brake 44 can have many designs, constructions, actions, and components depending on, among other influences, the designs and constructions of the final drive gearset 38 and wet clutch 12 and actuator 40. In the embodiment presented by FIGS. 2, 3, and 4, the brake 44 includes a first disc 78, a second disc 80, and a third disc 82. One or more of the first, second, and/or third discs 78, 80, 82 can constitute a braking component 45 of the brake 44. The first disc 78 has a smaller diameter than that of the second and third discs 80, 82. It can have a fixed attachment to the differential housing 54 so that the first disc 78 rotates with the differential housing and ring gear 52 during use of the FDU 10.

FIGS. 3-10 illustrate an alternate housing 90 for the FDU 10 or other driveline unit that defines at least part of an enclosed interior 92 in which may be received the various gearsets, actuator, clutch, etc, noted above or different components as is known in the art. To facilitate mounting the housing 90 to a vehicle, multiple mounts 94 are provided about the exterior of the housing, and may include openings for bolts or other couplers/connectors. The housing 90 includes a plurality of openings into the interior 92, including a first opening 96 into which the left rear sideshaft 28 may extend, a second opening 98 into which the right rear sideshaft 28 may extend, and a third opening 100 into which the propshaft 24 may extend (left and right are relative to the orientation of the driveline shown in FIG. 1).

To facilitate journaled rotation of the left rear sideshaft 28, the third opening 100 may be defined by an annular surface 102 of the housing 90. The surface 102 may include a bearing support and/or retention surface against which a bearing for the left rear sideshaft 28 may be received to enable smooth rotation of the left rear sideshaft relative to the housing 90.

To facilitate receipt of and connection to the housing 90 of the final drive gearset, differential gearset, clutch, actuator, etc, the second opening 98 may be defined at least in part by an enlarged mounting surface 104 for a cover 106 (FIG. 13) that is bolted to the housing 90 in assembly of the FDU 10. The cover 106 defines with the housing 90 the interior 92 of the housing in which the various gears and other components are received. A gasket may be received between the housing 90 and cover 106 in assembly, to provide a fluid-tight seal between them. To facilitate journaled rotation of the right rear sideshaft 28, the cover 106 may include an sideshaft opening defined by an annular surface of the cover that may include a bearing support and/or retention surface against which a bearing for the right rear sideshaft may be received. The first opening 96 and second opening 98 and the cover opening may be coaxially arranged and have an axis 108 perpendicular to an axis 110 of the third opening 100 so that the sideshafts 28 extend perpendicular to the propshaft 24.

The third opening 100 may be defined at least in part by a torque tube mounting surface 112 that may extend at a nonparallel angle (e.g. perpendicular, as shown) to the axis 110 about which the propshaft 24 rotates. The torque tube surrounds at least part of the propshaft 24 and is mounted to the housing 90 by a plurality of bolts received in mounting holes 114 (labeled in FIG. 3) formed in the housing 90, spaced apart around the torque tube mounting surface 112. A suitable gasket may be provided between the torque tube mounting surface 112 and the torque tube, in assembly. Adjacent to the mounting surface 112 and radially inwardly spaced therefrom, the housing 90 may include a cylindrical bearing support surface 116 against which a bearing for the propshaft 24 may be received.

The housing 90 may be formed from a cast metal and may include a central portion 118 that has an outer surface 120 which may be generally cylindrical and which bounds a surface area smaller than an outer surface 122 of the torque tube mounting surface 112. The central portion 118 has an inner surface 124 that may define the propshaft bearing surface (or support for a bearing) and support the propshaft 24 and/or gears driven by the propshaft and/or a disconnect mechanism, as is known in the art. In at least some implementations, the distance between the inner surface 124 and outer surface 120 of the central portion 118 (e.g. the radial thickness of the central portion) is between 3 mm and 5 mm. The torque tube mounting surface 112 may be defined in or by a mounting body 126 coupled to and preferably integrally formed in the same casting with the central portion 118 by multiple support walls 128 that extend outwardly from the outer surface 120 of the central portion 118 to a rear of the mounting body 126, where the front of the mounting body 126 defines the torque tube mounting surface 112. The mounting body 126, support walls 128 and central portion 118 are all integrally formed, at the same time, when the housing 90 is formed (e.g. in the same metal casting).

As shown in FIGS. 3-8, the support walls 128 are cantilevered to the housing 90, extend axially away from the mounting body 126 and are connected along their radial inner edge 130 (FIG. 5) to central portion 118 and have a radial outer edge 132 that is free, e.g., exposed to the exterior of the housing, a front edge or portion 131 connected to the mounting body 126, and a rear edge or portion at an end opposite to the front portion 131. One or more of the support walls 128 may have a radial outer edge 132 that is tapered or contoured to merge or blend into the outer surface of the housing 90, and so the axial front portion 131 of the support wall 128 (adjacent to the torque tube mounting surface 112) may be radially larger than the axial rear portion 133 of the support wall. The support walls 128 are circumferentially spaced apart from each other with circumferentially, radially and axially extending spaces 134 defined between adjacent support walls 128. These spaces 134 represent a lack of housing material and may result in a lighter weight housing for ease of mounting the driveline unit and improved fuel economy of a vehicle including the driveline unit. In at least some implementations, the spaces 134 defined between adjacent support walls 128 span a majority of a circumference of an imaginary circle that intersects each of said at least a majority of the support walls and is perpendicular to the axis 110, and up to 20% of the circumference of the imaginary circle, when the imaginary circle intersects a thinner portion of the support walls 128, axially spaced from the wider portions 136 and mounting holes 114.

To provide sufficient surface area for the mounting holes 114 by which the torque tube is mounted to the housing 90, the support walls 128 are circumferentially wider or thicker at their axial front portion (nearer the mounting body 126/mounting surface 112) providing a wider portion 136 in which a mounting hole 114 is formed in at least a majority of the support walls 128. The mounting surface 112 may be circumferentially continuous and joined to the axially forward portion 131 of each support wall 128. Circumferentially between the support walls 128 and the wider portions 136 thereof, the mounting body 126 may be axially thinner than combined thickness of the mounting body 126 and the wider portions 136, which may further enable production of a lighter housing 90.

Figure 8:
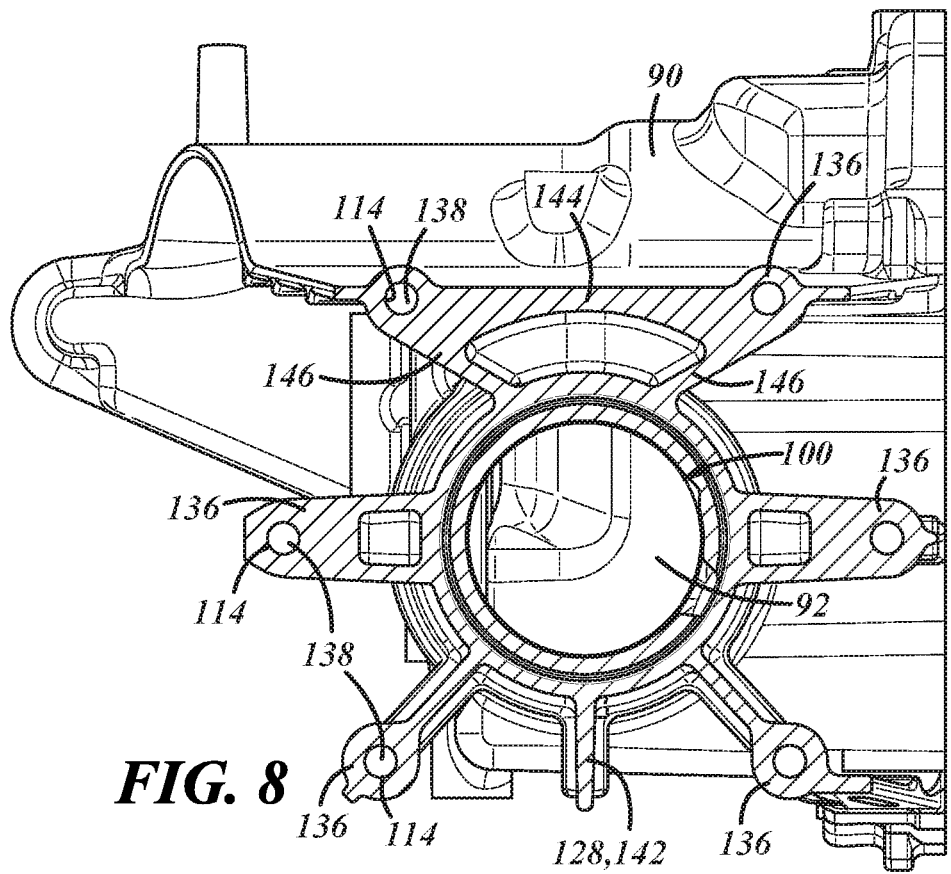
FIG. 8 is a sectional view taken along line 7-7 of FIG. 6.

The mounting holes 114 in the torque tube mounting surface 112 may be defined by blind bores that are formed in the mounting body 126 and are open through the mounting surface 112. As shown in FIG. 8, the mounting holes 114 may be formed in the wider portion 136 of at least some of the support walls 128 and axially terminate in a bottom surface 138 defined in the wider portion 136 of the support walls. The mounting holes 114 may be internally threaded for receipt of a threaded portion of a bolt. Thus, the support walls 128 are relatively thin in the circumferential dimension along at least a majority of their axial length, along a portion of the support wall that does not include a mounting hole 114 or an associated wider portion 136. The wider portion 136 of a support wall 128 has a circumferential thickness to provide a sufficient wall thickness surrounding the mounting hole. Axially spaced from the wider portion 136, each support wall 128 with a mounting hole 114 has a thickness in the circumferential direction that is between 10% and 40% the thickness of the wider portion 136, or 20% and 60% of the diameter of the mounting hole 114.

In at least some implementations, at least half (e.g. a majority) of the support walls 128 are radially oriented relative to the axis 110 of the third opening and extend through or are aligned with an axis 140 of the mounting hole 114 in such a support wall 128. In such an arrangement, an imaginary plane extends through and parallel to each respective one of these support walls (i.e. a separate plane for each such support wall) and intersects the axis 140 of the mounting holes 114 and the axis 110 of the propshaft. The support walls 128 may be circumferentially spaced apart by at least forty degrees, and in some implementations, by at least fifty degrees. The support walls may extend a radial distance between the outer surface 120 of the central portion 118 and the radial outer surface of the support walls. A distance from the axis 110 to the outer surface 120 of the central portion may be between 30% and 75%, and in some implementations between 40% and 65% of the distance between the axis 110 and the outer edge of a support wall 128. In at least some implementations, support walls not including a mounting hole may have a distance from the axis 110 to the outer surface 120 of the central portion that is between 50% and 75% of the distance between the axis 110 and the outer edge 132 of such a support wall 128. In at least some implementations, support walls that include a mounting hole may have a distance from the axis 110 to the outer surface 120 of the central portion that is between 35% and 50% of the distance between the axis 110 and the outer edge 132 of such a support wall 128.

One or more support walls 128 may extend to the mounting body 126 at a location in which no mounting hole 114 is provided and such support wall(s) may, but need not, include a wider portion 136. In the example shown, a support wall 142 (labeled as 128, 142 in FIGS. 7 and 8) extends axially from a lower portion of the mounting body 126 (relative to gravity) does not include a wider portion 136 and does not lead to or include a mounting hole 114. This support wall 142 is between two support walls 128 that each are aligned with or include a wider portion 136 and corresponding mounting holes 114.

Figure 7:
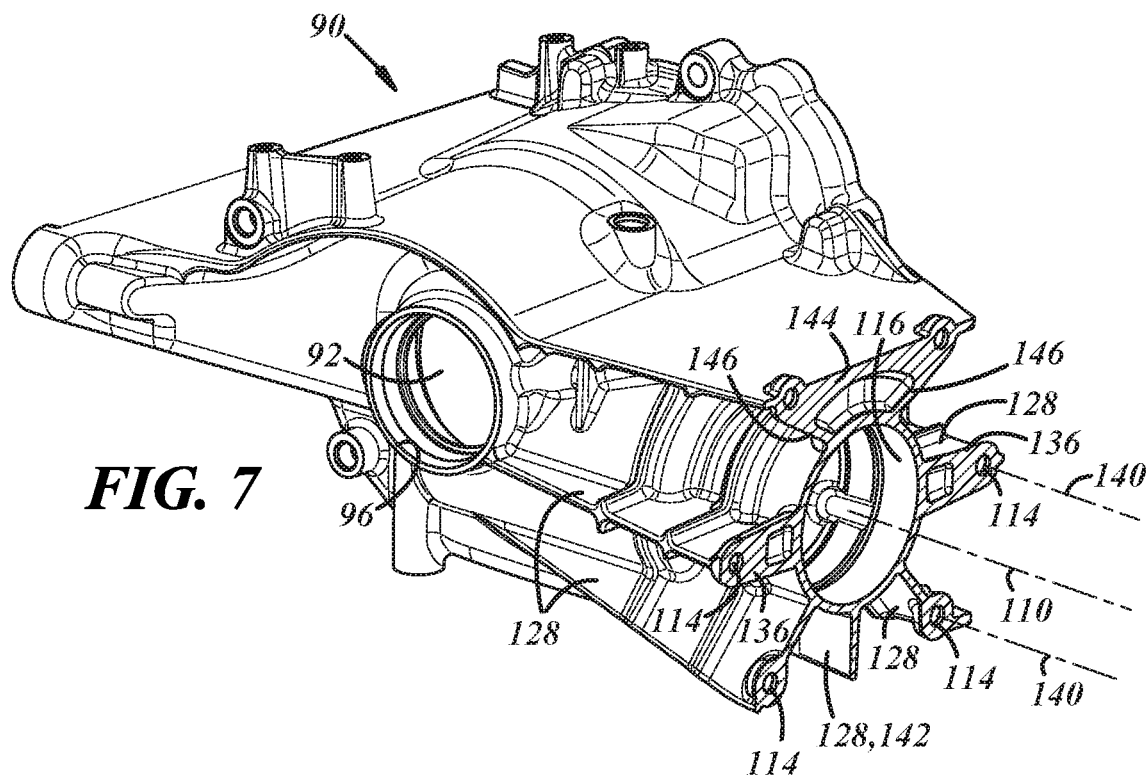
FIG. 7 is a perspective sectional view taken along line 7-7 of FIG. 6.

As shown in at least FIGS. 7-8, two mounting holes 114 may be connected together by a connecting wall 144 that extends between the mounting holes 114 outboard of the central portion 118 of the housing 90. The portion of the connecting wall 144 that includes the mounting holes 114 may be coupled to the central portion 118 by intermediate support walls 146 that extend radially or generally radially from the axis (where "generally radially" means within 20 degrees of a radius from the axis 110).

Figure 9:
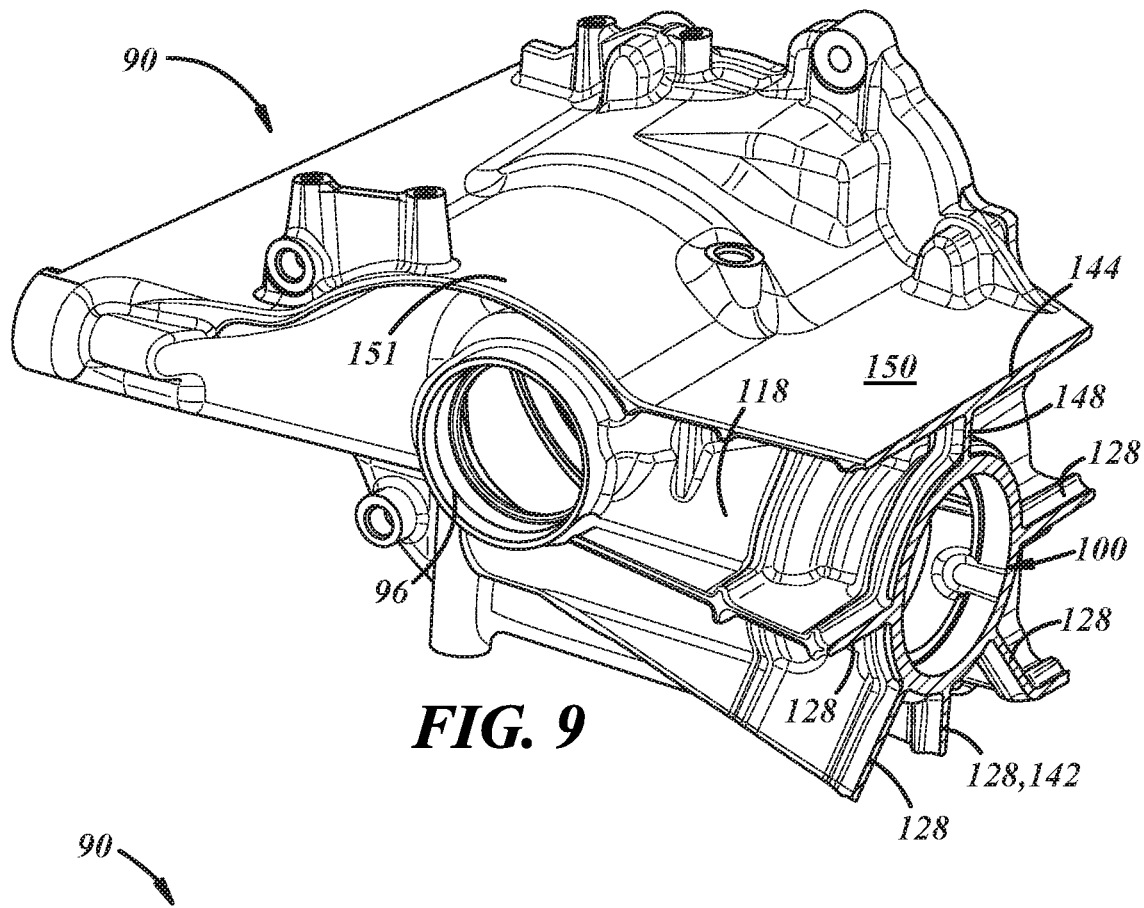
FIG. 9 is a perspective sectional view taken along line 9-9 of FIG. 6.
Figure 10:
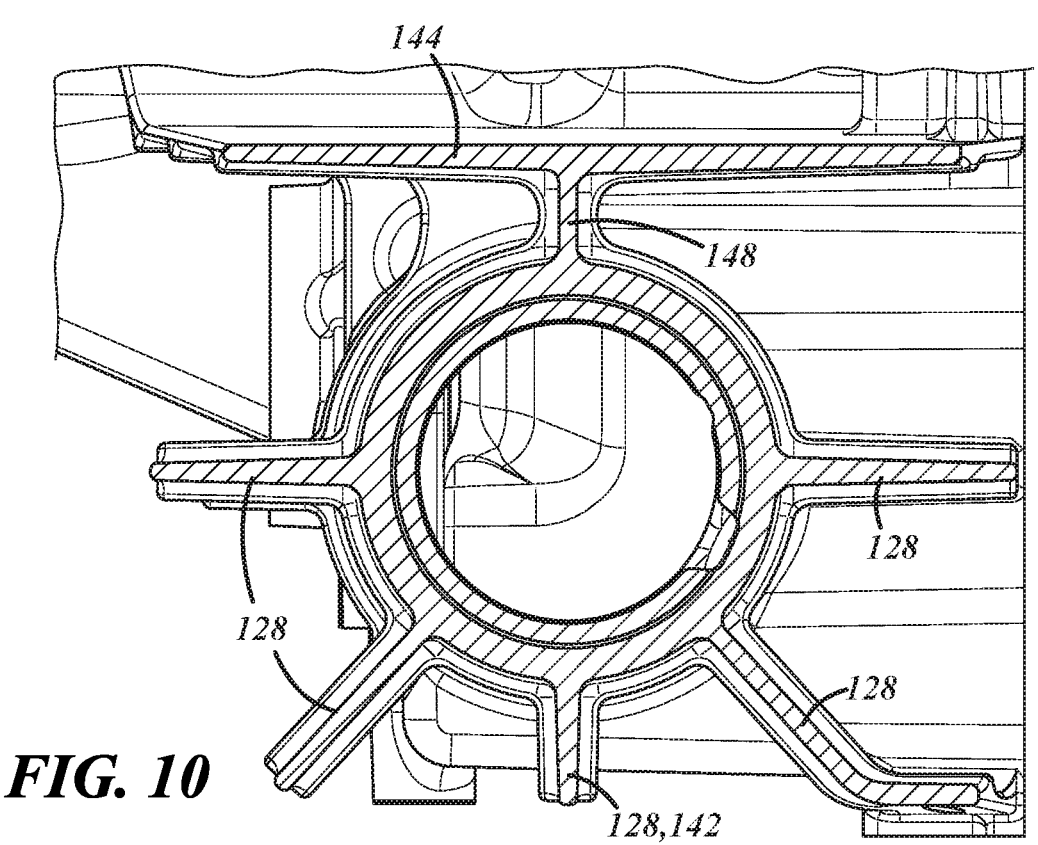
FIG. 10 is a sectional view taken along line 9-9 of FIG. 6.

As shown in FIGS. 9 and 10, the intermediate support walls 146 extend only a portion of the axial distance from the mounting body 126. Axially inboard (axially away from the mounting surface 112) from the intermediate support walls 146, a single support wall 148 is coupled to the housing 90 at a rear side of the support wall 148, to the central portion 118 along a lower side of the support wall 148, to the connecting wall 144 at an upper side of the support wall 148 and has a front side that does not (but could if desired) extend to the mounting body 126. Left and right sides of the support wall 148 may be exposed to the exterior of the housing 90 and define part of an open space between the connecting wall 144 and adjacent support walls 128.

The connecting wall 144 may be located at a vertically upper portion of the mounting surface 112 or mounting body 126 and extend axially and laterally (radial direction, perpendicular to the axis but spaced from the axis 110) along an upper surface of the housing 90. The connecting wall 144 may be radially spaced from the central portion 118 and extend laterally beyond the central portion 118 so that that connecting wall defines part of the open space between the circumferentially adjacent support wall 128 on either side of the central portion. The connecting wall 144 may have a flat portion 150 (FIG. 9) that is perpendicular or within ten degrees of perpendicular to the direction of gravity and may be located above (with respect to gravity) the central portion 118 of the housing 90. The connecting wall 144 may have a curved portion 151 with a radius of curvature similar to the radius of the first opening 96, and the curved portion 151 may extend outwardly, axially beyond the portion of the housing 90 that defines the first opening 96 (where "axially" is relative to the axis of the first opening 96). The connecting wall 144 may provide a water/debris shield that directs contaminants that may be splashed above the housing 90 away from the bearing surfaces and/or mounting surface.

Figure 11:
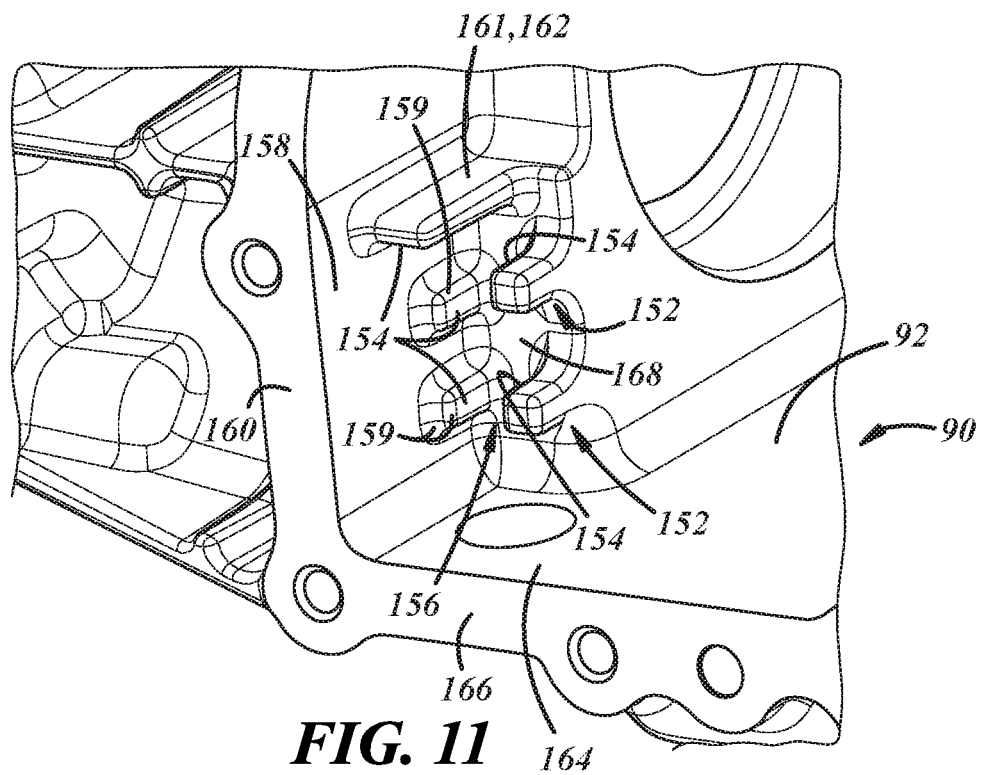
FIG. 11 is a fragmentary perspective view showing integrally formed retention surfaces.
Figure 12:
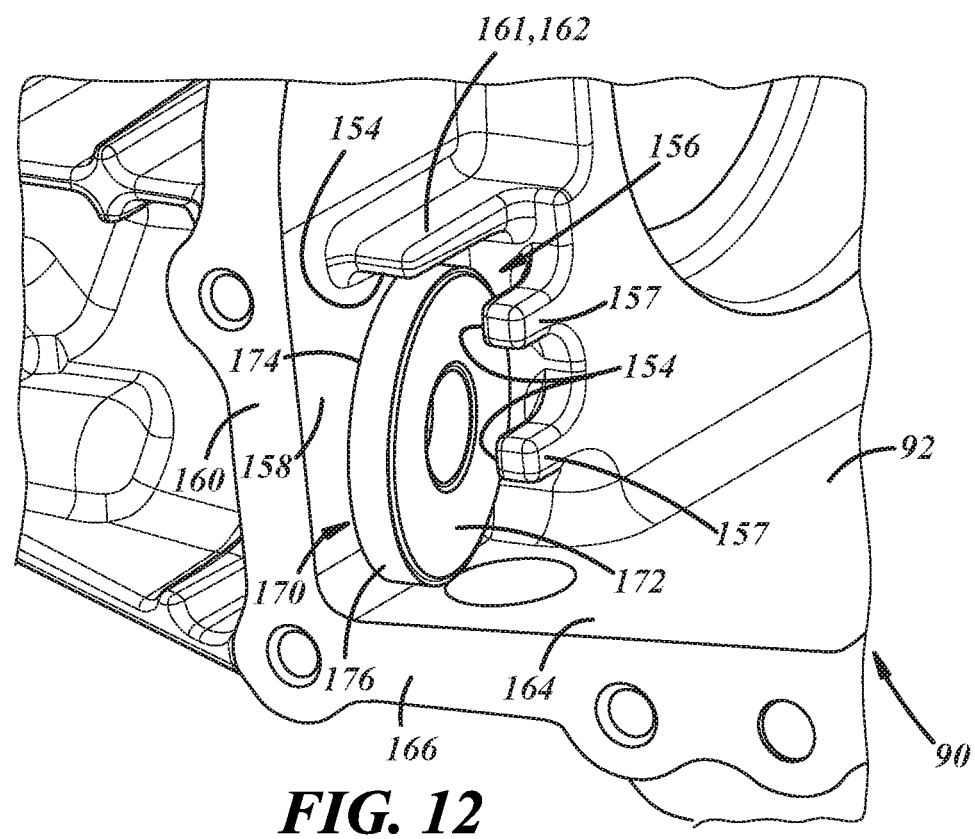
FIG. 12 is a view similar to FIG. 11 and showing a magnet received between and overlapped by the retention surfaces.
Figure 13:
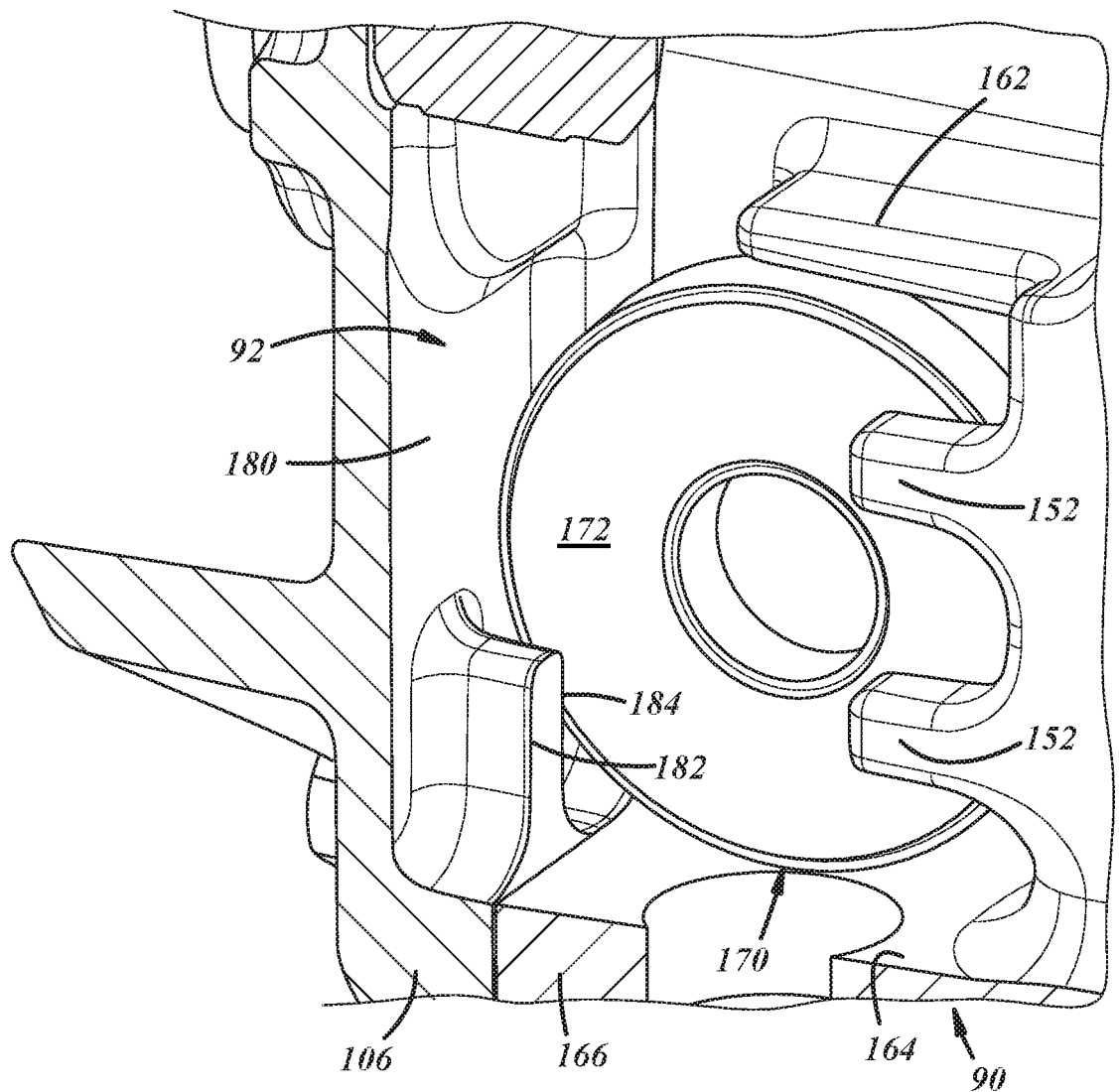
FIG. 13 is a perspective view showing the retention surfaces, magnet and a cover secured to the housing and trapping the magnet between the cover and housing.

As shown in FIGS. 11-13, to retain a component within the housing 90, the housing 90 may include retention features 152 that may be formed integrally in the housing (e.g. in the same casting). The retention features 152 include retention surfaces 154 that define an interior space 156 in which a component may be received. The interior space 156 may have a shape suitable to provide retention surfaces 154 that are spaced apart and oriented to overlap at least two sides or portions of a component. In the example shown the retention surfaces 154 are defined by tabs 157 formed integrally with the housing 90, within the interior of the housing, and that are parallel or generally parallel (e.g. within ten degrees) to an inside surface 158 of a first wall 160 or portion of the housing 90 but spaced from that inside surface 158. Thus, the inside surface 158 and the retention surface(s) 154 of the tab(s) nearest to the inside surface 158 define opposed retention features between which a component may be received. The inside surface 158 of the housing 90 may be planar, or it may include tabs 159 or protrusions (as in the example shown in the drawings) that extend outwardly from a main portion of the inside surface 158, and such tabs or protrusions in turn define retention surfaces arranged to engage and retain the component. These retention surfaces 154 may define sides or boundaries of the interior space 156.

In at least some implementations including that shown in FIGS. 11-13, a further retention feature 161 is defined by an upper tab 162 is arranged to extend at least partially between the sides of the interior space 156 and overlie a first end (e.g. an upper portion) of the interior space. An inside surface 164 of a second wall 166 of the housing 90, which is not parallel to the first wall 160, or another tab formed in the housing 90 may define a retention surface 154 at a second end of the interior space 156, opposite the first end. This retention surface 154 extends at least part of the way between the sides of the interior space defined by the tabs 157 and surface 158. Further, in at least some implementations, the housing 90 includes another retention surface 168 that extends at least partially between the sides and at least partially between the ends of the interior space 156. This retention surface 168 defines a rear portion of the interior space 156 and limits movement of a component received in the interior space. In this manner, the component may be at least partially overlapped by retention surfaces at two sides, at two ends and at a rear of the interior space 156.

As shown in FIG. 12, a magnet 170 may be a component that is retained by the retention features/surfaces of the housing 90. The magnet 170 may have any desired shape and is shown as being an annular disk with planar first and second sides 172, 174 that are received adjacent to the retention surfaces (e.g. 154, 158, 164) that define at least part of the sides of the interior space 156. Opposite portions of the magnet (e.g. diametrically opposed areas of a cylindrical sidewall 176 of the magnet) are overlapped by the retention surface 154 of tab 162 and surface 164 of wall 166 that define opposed ends of the interior space 156. The magnet may serve to collect magnetic contaminants in the interior of the housing, such as metal chips or shavings, to prevent such contaminants from being circulated to gears and components in the housing when the lubricant is distributed in the housing. More than one magnet may be provided, and so the housing 90 may have other interior spaces defined by retention features and surfaces as set forth with regard to the interior space 156 shown in FIGS. 11-13.

In the example shown, a front of the interior space 156 is open to facilitate placing a component, such as the magnet 170, within the interior space 156. As shown in FIG. 13, a second housing 106 may be coupled to the housing 90 at the mounting surface 104. The second housing 106 may have an inner surface 180 that defines a retention surface that, when the second housing 106 is coupled to the first housing 90, closes the front of the interior space 156 to trap the magnet 170 (or other component) within the interior space. The second housing 106 may have a tab 182 extending outwardly from the inner surface 180 and having a retention surface 184 adapted to overlie part of the outward face 172 of the magnet 170 to inhibit movement of the magnet out of the space 156. Other arrangements are possible and will be apparent from this description. For example, a side other than the front of the interior space 156, such as the top of the interior space 156, may be open and may be closed by the second housing 106 (e.g. by a tab that extends from the second housing into the interior of the first housing and over the interior space 156) or another component in assembly of the device. Further, the second housing 106 may include retention features that overlap and define more than one side of the interior space 156 in addition to or instead of retention surfaces of the first housing 90.

Accordingly, the component 170 is trapped in position by the retention features of the first housing 90 and second housing 106. Previously, a magnet 170 had to be glued in place or secured with a mechanical fastener such as a screw or clip. The magnet 170 could be damaged by the screw or glue, and/or the process to assembly the magnet 170 into the housing 90 was labor intensive and costly. With the retention surfaces, the magnet 170 is retained in position by without requiring any fastener, adhesive or other retainer, and without requiring an additional assembly step to separately secure the magnet.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A housing for a driveline unit, comprising:
a body defining an interior and having a central portion with an inner surface defining part of the interior and an outer surface defining part of an exterior of the housing, a plurality of openings through the housing each adapted to receive a driveline shaft with rotation of each driveline shaft relative to the body,
wherein the body includes a mounting body having a mounting surface adjacent to and defining one of the openings, the mounting surface includes a plurality of mounting holes, the mounting surface having a peripheral length greater than a peripheral length of the central portion; and
wherein the body includes a plurality of support walls extending between the central portion and the mounting body, the support walls extend axially relative to an axis of rotation of a shaft received through the opening defined by the mounting surface, and at least a majority of the support walls extend radially and a plane through and parallel to each of the at least a majority of the support walls intersects an axis of the mounting holes and the axis of rotation, and wherein the support walls are circumferentially spaced apart and spaces defined between the support walls span a majority of a circumference of an imaginary circle that intersects each of said at least a majority of the support walls.

2. The housing of claim 1, wherein at least a majority of the support walls are circumferentially aligned with a mounting hole and include a circumferentially wider portion in which a mounting hole is at least partially defined, the wider portion is axially adjacent to the mounting body and said at least a majority of the support walls have a circumferentially thinner portion extending axially from the wider portion.

3. The housing of claim 2 wherein the wider portions are wider than the diameter of the mounting holes and axially longer than the axial depth of the mounting holes.

4. The housing of claim 2 wherein, in said at least a majority of the support walls that have a wider portion, a thickness in the circumferential direction of said at least a majority of the support walls at a location axially spaced from the respective wider portion is between 10% and 40% of the thickness in the circumferential direction of the wider portion.

5. The housing of claim 2 wherein one support wall that is not part of said at least a majority of support walls that includes a wider portion extends axially from the mounting body and is circumferentially located between two support walls of said at least a majority of support walls that includes a wider portion.

6. The housing of claim 1 wherein the support walls are spaced apart circumferentially by at least forty degrees.

7. The housing of claim 1 wherein the distance from the axis of rotation of a shaft received through the opening defined by the mounting surface to an outer surface of the central portion is between 30% and 75% of the distance between the axis of rotation of a shaft received through the opening defined by the mounting surface and the outer edge of a support wall.

8. The housing of claim 1 wherein the housing includes a connecting wall that extends between two support walls and which connects together and is circumferentially between two mounting holes.

9. The housing of claim 8 wherein the connecting wall is connected to a support wall that extends radially relative to the axis of rotation.

10. A driveline unit for a vehicle, comprising:
a propshaft driven for rotation about an axis;
a torque tube surrounding at least part of the propshaft;
two sideshafts each adapted to be coupled to a respective vehicle wheel;
differential gears coupled to the sideshafts;
a drive gear coupled to the propshaft for rotation with the propshaft;
a driven gear driven for rotation by the drive gear and coupled to a gear of the differential gears;
a housing having a body with a first opening through which one sideshaft extends, a second opening through which the other sideshaft extends, a third opening through which the propshaft extends, a mounting surface to which the torque tube is mounted by a plurality of bolts extending into a plurality of mounting holes formed in the mounting surface, wherein the differential gears and drive gear are received within an interior of the housing, wherein the body includes a plurality of support walls extending between the central portion and the mounting body, the support walls extend axially relative to an axis of rotation of the propshaft, and at least a majority of the support walls extend radially and a plane through each of the at least a majority of the support walls intersects an axis of the mounting holes and the axis of rotation.

11. The driveline unit of claim 10 wherein the support walls are circumferentially spaced apart and spaces defined between the support walls span a majority of a circumference of an imaginary circle that intersects each of said at least a majority of the support walls.

12. The driveline unit of claim 10 wherein the body has a central portion with an inner surface defining part of the interior and an outer surface defining part of an exterior of the housing, and wherein the body includes a mounting body that includes the mounting surface, and the mounting surface has a peripheral length greater than a peripheral length of the outer surface of the central portion.

13. The driveline unit of claim 10, wherein at least a majority of the support walls are circumferentially aligned with a mounting hole and include a circumferentially wider portion in which a mounting hole is at least partially defined, the wider portion is axially adjacent to the mounting body and said at least a majority of the support walls have a circumferentially thinner portion extending axially from the wider portion.

14. The driveline unit of claim 13 wherein, in said at least a majority of the support walls that have a wider portion, a thickness in the circumferential direction of said at least a majority of the support walls at a location axially spaced from the respective wider portion is between 10% and 40% of the thickness in the circumferential direction of the wider portion.

15. A housing for a driveline unit, comprising:
a body defining an interior and having a central portion with an inner surface defining part of the interior and an outer surface defining part of an exterior of the housing, a plurality of openings through the housing each adapted to receive a driveline shaft with rotation of each driveline shaft relative to the body, wherein the body includes a mounting body having a mounting surface adjacent to and defining one of the openings, the mounting surface includes a plurality of mounting holes, the mounting surface having a peripheral length greater than a peripheral length of the central portion; and wherein the body includes a plurality of support walls extending between the central portion and the mounting body, the support walls extend axially relative to an axis of rotation of a shaft received through the opening defined by the mounting surface, and at least a majority of the support walls are arranged so that a separate plane through and parallel to each of the at least a majority of the support walls intersects an axis of the mounting holes and the axis of rotation.

16. The housing of claim 15 wherein at least a majority of the support walls are circumferentially aligned with a mounting hole and include a circumferentially wider portion in which a mounting hole is at least partially defined, the wider portion is axially adjacent to the mounting body and said at least a majority of the support walls have a circumferentially thinner portion extending axially from the wider portion.

17. The housing of claim 16 wherein the wider portions are wider than the diameter of the mounting holes and axially longer than the axial depth of the mounting holes.

18. The housing of claim 16 wherein, in said at least a majority of the support walls that have a wider portion, a thickness in the circumferential direction of said at least a majority of the support walls at a location axially spaced from the respective wider portion is between 10% and 40% of the thickness in the circumferential direction of the wider portion.

19. The housing of claim 16 wherein one support wall that is not part of said at least a majority of support walls that includes a wider portion extends axially from the mounting body and is circumferentially located between two support walls of said at least a majority of support walls that includes a wider portion.

20. The housing of claim 15 wherein the distance from the axis of rotation of a shaft received through the opening defined by the mounting surface to an outer surface of the central portion is between 30% and 75% of the distance between the axis of rotation of a shaft received through the opening defined by the mounting surface and the outer edge of a support wall.

* * * * *